Oct. 19, 1937.   J. W. LEIGHTON   2,096,115
INDEPENDENT WHEEL SUSPENSION
Filed Nov. 20, 1933   3 Sheets-Sheet 1

Inventor.
John Wycliffe Leighton

Oct. 19, 1937.                J. W. LEIGHTON                2,096,115
                        INDEPENDENT WHEEL SUSPENSION
                        Filed Nov. 20, 1933            3 Sheets-Sheet 2
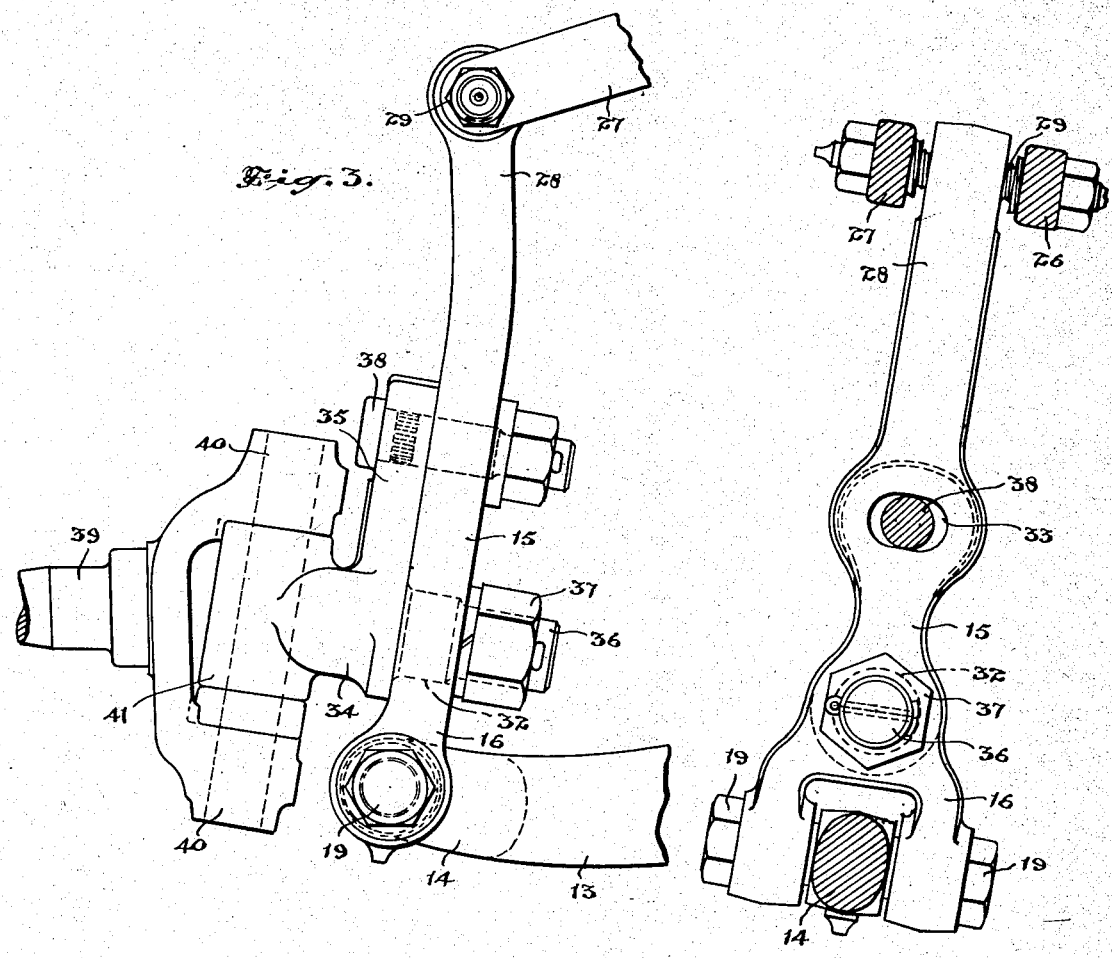
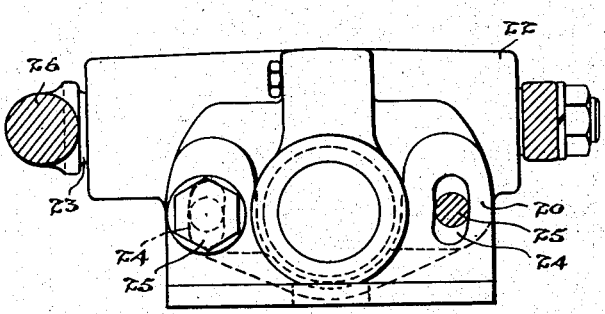
Inventor.
John Wycliffe Leighton Oct. 19, 1937.   J. W. LEIGHTON   2,096,115
INDEPENDENT WHEEL SUSPENSION
Filed Nov. 20, 1933   3 Sheets-Sheet 3
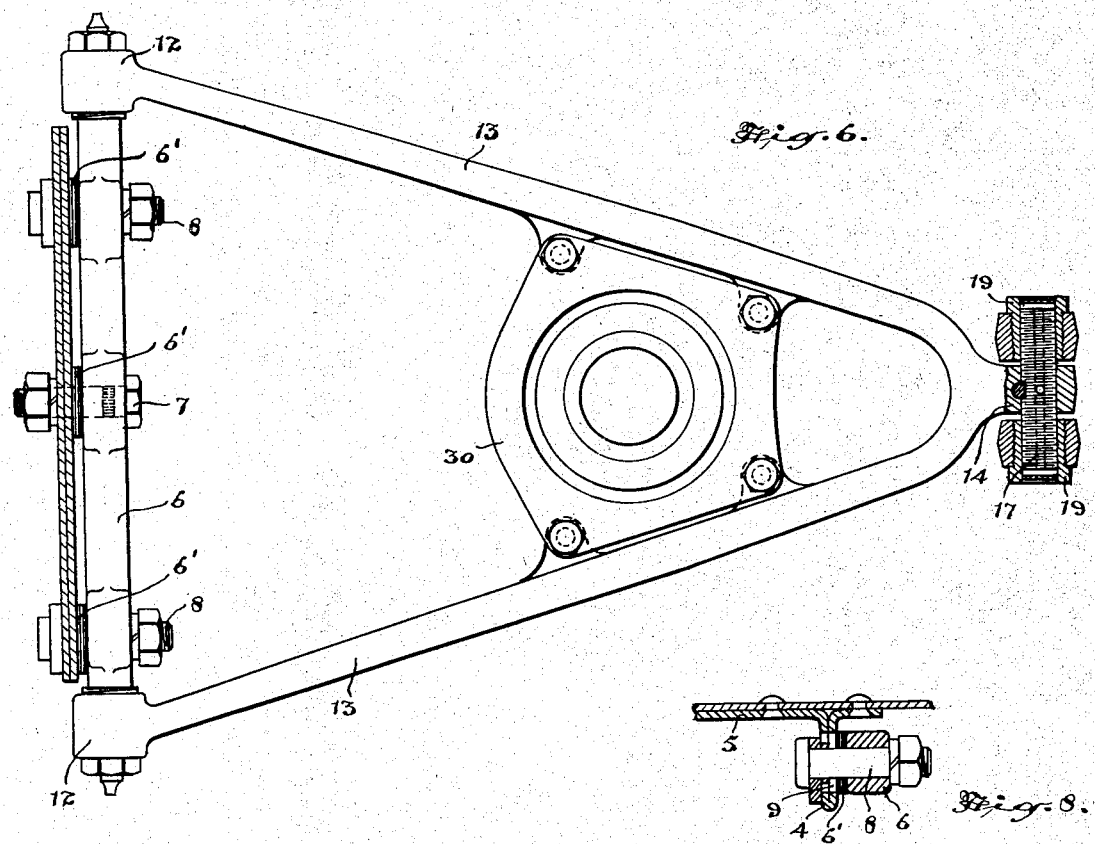
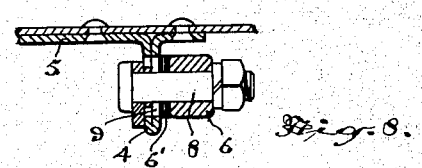
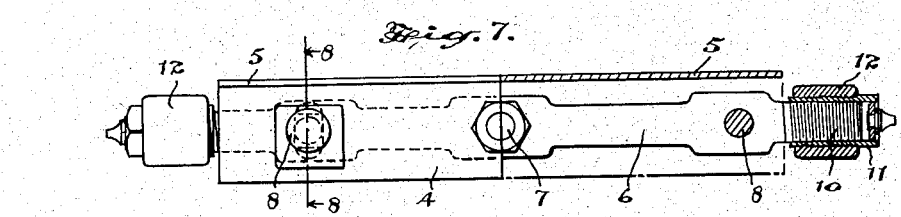
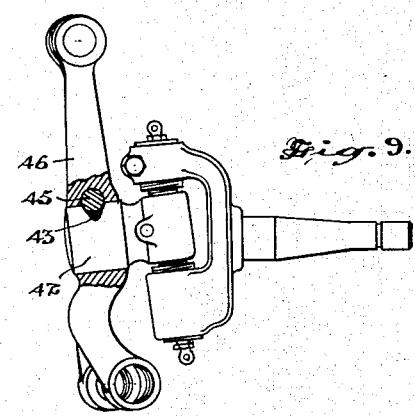
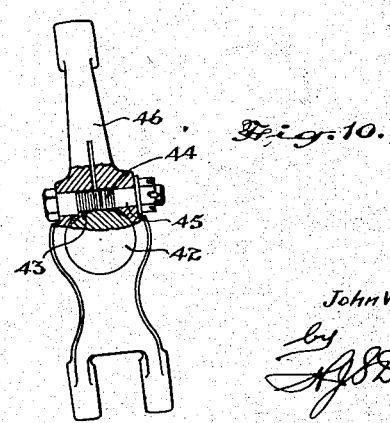
Inventor.
John Wycliffe Leighton Patented Oct. 19, 1937

2,096,115

UNITED STATES PATENT OFFICE 2,096,115

INDEPENDENT WHEEL SUSPENSION

John Wycliffe Leighton, Port Huron, Mich.

Application November 20, 1933, Serial No. 698,846

6 Claims. (Cl. 280—124)

The present invention has been devised for the purpose of enhancing the riding qualities of motor cars by supporting the front end of the frame of the car by means independently connected to the opposite wheels and thereby reducing the transmission of shocks to the frame resulting from inequalities in road surfaces, and providing a structure which permits of the use of low rate springs thereby stabilizing the car and producing a smooth riding vehicle.

A very important object of this invention is to provide a suspension which will enable a simple and accurate adjustment of "caster" of the wheel settings without interfering with the alignment of the bearing surfaces.

The principal features of the invention consist in the novel construction and arrangement of arms pivotally connected to and extending laterally from the car frame, resiliently supporting the load and hinged freely to king pin supports upon which king pins are adjustably mounted to permit independent adjustment of the angularity of the king pins and the wheel assemblies mounted thereon while maintaining parallel alignment of the hinge bearings.

In the accompanying drawings, Figure 1 is a plan view of a wheel suspension showing a preferred form of "caster" adjustment mounting for the king pin.

Figure 3 is an enlarged front elevational view showing the king pin support and adjustable king pin bracket.

Figure 4 is an enlarged elevational view taken from the inner side of the king pin support shown in Figure 3.

Figure 5 is an enlarged end elevational view of the shock absorber support element for the upper pivotal arms of the suspension.

Figure 6 is a plan view in part section of the lower pivot arm and its adjustable pivot support on the frame of the car.

Figure 7 is an elevational view of the adjustable pivot arm support shown partly in section.

Figure 8 is a cross sectional view through the line 8—8 of Figure 7.

Figure 9 is a front elevational part sectional view of a modified form of king pin support.

Figure 10 is a side elevational part sectional view of the support shown in Figure 9.

Figure 1:
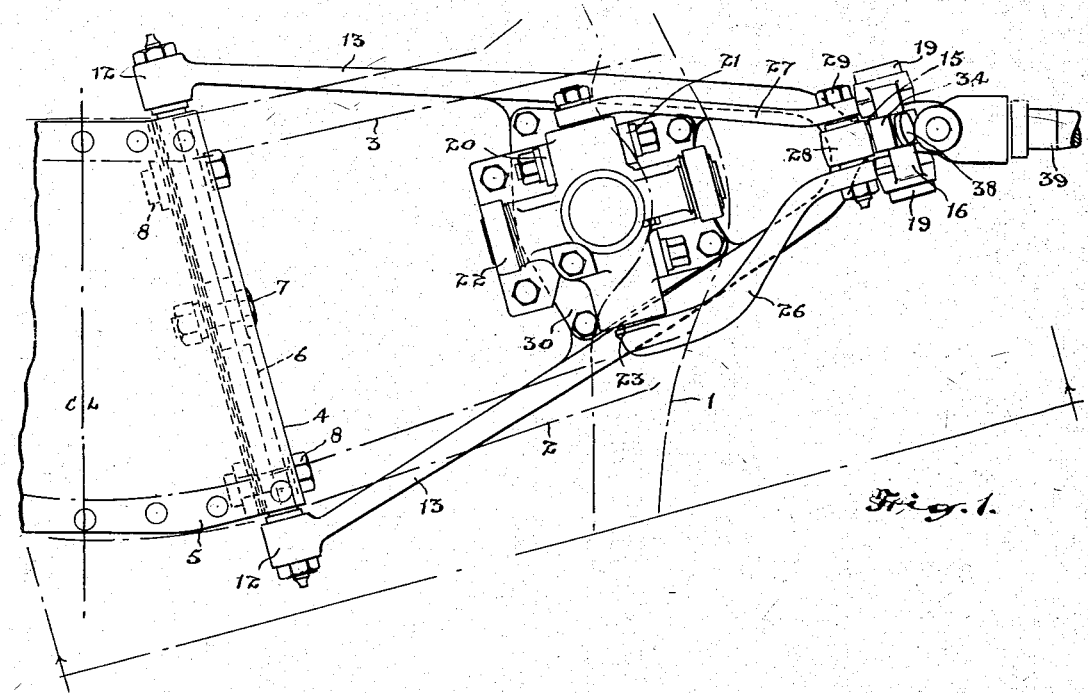
Figure 2:
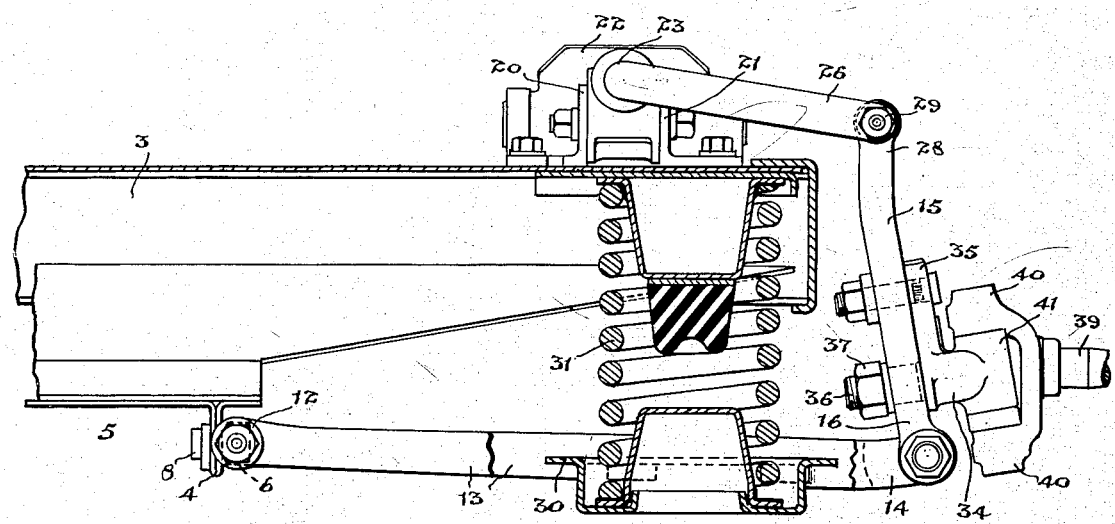
Figure 2 is a front elevational part sectional view of the assembly.

In the present invention the accompanying drawings illustrate in part the frame of a motor car, the side sill 1 of which has secured thereto a pair of rigid horizontal cross bars 2 and 3 which are spaced apart.

An angle bar 4 here shown as a part of a plate 5 secured rigidly to the underside of the bars 2 and 3, is arranged at each side of the centre line C. L. of the car and at an acute angle thereto, the front end thereof being spaced farther from the centre line than the rear end.

A bar 6 is pivotally mounted centrally of its length upon a bolt 7 secured centrally of the bar 4 and is adapted to swing thereon in a vertical plane, features pertaining to such bar mounting being set forth and claimed in a division of this application, filed March 15th, 1937, Serial No. 130,878.

Bolts 8 are mounted in the bar 6 adjacent to each end and extend through vertically arranged slots 9 in the angle bar which permit the bar to be swung to adjusted positions and rigidly secured.

The extremities of the bar 6 are provided with threaded bearing surfaces 10 and on these are threaded the bushings 11 which are internally threaded to provide bearing surfaces and said bushings are externally threaded with a locking thread to engage the correspondingly threaded hubs 12 of the "wishbone" arm 13 which extends angularly outward beyond the frame sill 1 in a substantial horizontal position. The outer end, or apex, of the "wishbone" 13 is formed with a lug 14.

A bar 15, which forms the king pin support, is formed with a forked end 16 which spans the lug 14. A bolt 17 extends through and is secured in the lug 14 and ends 18 thereof are threaded and engage in threaded bearing contact with the adjustable threaded bushings 19 mounted in the lug ends of the fork 16.

Mounted above the frame sill 1 are a pair of flanged brackets 20 and 21 between which is mounted a suitable type of "shock absorber" device 22 provided with a spindle 23 which is arranged in parallel alignment with the bar 6. The supporting brackets 20 and 21 are provided with vertically slotted lugs 24 through which the bolts 25 extend to adjustably secure the member 22.

An arm 26, rigidly secured to or forming part of the spindle 23 of the "shock absorber" extends horizontally outward therefrom above the "wishbone" arm; and an arm 27 rigidly secured to the opposite end of the "shock absorber" spindle 23 also extends horizontally outward and the extremities of said arms extend either side of the upper end 28 of the king pin support 15. A threaded bolt 29 secured in the end 28 of the king pin support extends into the ends of the arms 26 and 27 where it is secured in an adjustable bearing joint by suitable threaded bearing bushings, preferably in the manner disclosed in my co-pending applications Serial No. 695,412, or 746,152.

The "wishbone" arm 13 is provided with a plate section 30 arranged below the "shock absorber" member 22 and a spiral compression spring 31 is mounted between said "shock absorber" and said plate and is adapted to support the vehicle load.

The king pin support 15 is formed with a cylindrical orifice 32 a short distance above its forked lower end and it is also provided with a transverse slot 33 arranged intermediate of its length.

The king pin bracket 34 is formed with a bar section 35 which fits against the outward face of the king pin support and a stud 36 rigid with said bracket extends through the orifice 32 and is secured by a nut 37. A bolt 38 extends through the upper end of the bar 35 and through the slot 33 in the king pin support and secures the bracket rigidly in adjusted positions.

The wheel axle 39 is provided with a jaw member 40 which spans the hub portion 41 of the king pin bracket and a suitable king pin connects the members in a hinge joint.

Thus by loosening the nut 37 and bolt 38, the king pin bracket may be rocked to increase or decrease the caster angle of the king pin and thereby cause the wheel to "trail" to a greater or lesser extent as may be desired independent of the particular "set" or adjustment imparted to the main suspension assembly.

If it is necessary to alter the position of the arm 28 between the arms 26—27 this adjustment can be effected by altering the relation of the threaded journal members connecting the arms 26—27—28 as defined in my co-pending application Serial No. 695,412 above referred to. The shock absorber unit may then be bolted in its adjusted position. It is important to note that the king pins may then at any time be individually adjusted for "caster" without in any way disturbing the adjustment of the main suspension assembly and its several hinge joints.

The pivot arrangement of the king pin support provides a very flexible adjustment for the "caster" set of the wheels and various modifications may be devised. A modified form is shown in Figures 9 and 10 in which the pivot stud 42 of the king pin bracket is milled with a thread surface 43 which is engaged by the threaded portion 44 of the cross bolt 45. The king pin support 46 is split longitudinally from the pivot orifice so that when the bolt 45 is tightened the stud will be rigidly secured by the binding of the split member as well as by the engagement of the bolt thread.

With this type of mounting a very sensitive adjustment of the king pin about the axis of the stud 42 and relative to the supports 46 may be effected by simply rotating the threaded cross bolts which act as a worm drive against the milled surface of the stud and after securing the desired adjustment the adjustment is preserved by tightening the locking nut on the bolt.

What I claim as my invention is:—

1. In a vehicle wheel suspension, a king pin supported by a wheel axle, a vehicle frame, arms extending laterally from said frame, a support hinged to and directly connecting said arms, and a member mounted on said king pin and adjustable on said hinged support in a plane disposed transversely of the wheel axis to enable a "caster" adjustment of the king pin relative to said arms and hinged support.

2. In an independent vehicle wheel suspension, a frame, a pair of arms hinged to the frame, a king pin support connecting the free ends of said arms and hinged freely thereto, means carrying a king pin mounted on said hinged king pin support and capable of rocking adjustment thereon in a direction fore and aft of the vehicle independent of the hinged connections to effect the alteration of the caster angle of the king pin, and a wheel axle mounted on the king pin.

3. In an independent vehicle wheel suspension, a frame, a pair of arms hinged to the frame and extending laterally therefrom, a member connecting said arms and hinged freely thereto, a king pin bracket pivoted on said hinged connecting member, a king pin, and a wheel axle mounted on said king pin, the pivot of said king pin bracket on the hinged connecting member being disposed substantially horizontal to permit a rocking adjustment relative to said hinged connecting member to vary the angularity of the king pin axis in relation to the said hinged connecting member.

4. In an independent vehicle wheel suspension, a frame, a pair of arms hinged to said frame to swing in a vertical plane, means directly hinged to the outer ends of said arms and connecting same to swing in unison therewith, a member rotatably mounted in the latter means on an axis disposed transversely of the longitudinal centre line of the vehicle frame, a king pin rigidly mounted in said rotatable member, means for rigidly holding said rotatable king pin member in adjusted positions relative to said hinged connecting means to retain the king pin at an angle of predetermined "caster" in relation to the said hinged connecting means, and a wheel axle carried by said king pin.

5. In a vehicle wheel suspension, a vehicle frame, arms extending laterally from said frame, a king pin support hinged to and connecting said arms, a king pin, a member mounted on said king pin and having a rocking adjustment relative to said hinged support about a substantially horizontal axis, and threaded means mounted in said hinged support and adjustably engaging and adjustably locking said king pin member in adjusted relation to said hinged support with the king pin axis disposed at a desired adjusted angularity.

6. A vehicle wheel suspension comprising, a king pin supported by a wheel axle, a vehicle frame, arms extending laterally from said frame, a support hinged to and directly connecting said arms, and a member mounted on said king pin and pivotally adjustable on said hinged support, the axis on which the last mentioned member is pivotally mounted being disposed in a direction transversely of the vehicle frame to permit a rocking adjustment of the king pin in a fore and aft direction of the vehicle to vary "caster".

JOHN WYCLIFFE LEIGHTON.